United States Patent
Schroeder

(10) Patent No.: US 7,249,488 B2
(45) Date of Patent: Jul. 31, 2007

(54) METHOD FOR DETECTING A ZERO-POINT ERROR OF A CORIOLIS GYROSCOPE AND CORIOLIS GYROSCOPE USING SAID METHOD

(75) Inventor: Werner Schroeder, Ettenheim (DE)

(73) Assignee: LITEF GmbH, Freiburg im Breisgau (DE)

(*) Notice: Subject to any disclaimer, the term of this patent is extended or adjusted under 35 U.S.C. 154(b) by 0 days.

(21) Appl. No.: 10/531,811

(22) PCT Filed: Oct. 2, 2003

(86) PCT No.: PCT/EP03/10971
§ 371 (c)(1),
(2), (4) Date: Apr. 18, 2005

(87) PCT Pub. No.: WO2004/038332
PCT Pub. Date: May 6, 2004

(65) Prior Publication Data
US 2005/0279155 A1  Dec. 22, 2005

(30) Foreign Application Priority Data
Oct. 18, 2002  (DE) .................................. 102 48 736

(51) Int. Cl.
*G01C 25/00*  (2006.01)
*G12B 13/00*  (2006.01)

(52) U.S. Cl. .................... 73/1.77; 73/504.02; 73/1.37; 73/1.38; 73/504.16; 33/318

(58) Field of Classification Search ............ 73/1.37, 73/1.38, 504.12, 504.13, 504.14, 504.15, 73/504.16, 1.77, 504.02
See application file for complete search history.

(56) References Cited

U.S. PATENT DOCUMENTS

| 4,870,588 | A  | * | 9/1989 | Merhav ..................... 701/220 |
| 5,377,523 | A  | * | 1/1995 | Ohta et al. .................. 73/1.38 |
| 6,553,833 | B1 | * | 4/2003 | Funk et al. ................ 73/504.14 |
| 6,564,637 | B1 | * | 5/2003 | Schalk et al. ............. 73/504.12 |
| 2003/0074968 | A1 | * | 4/2003 | Fell et al. ................. 73/504.12 |
| 2004/0088127 | A1 | * | 5/2004 | M'Closkey et al. .......... 702/96 |
| 2006/0201233 | A1 | * | 9/2006 | Schroeder ................... 73/1.77 |

FOREIGN PATENT DOCUMENTS

| DE | 19537577 | 4/1996 |
| DE | 69711823 | 6/1998 |
| DE | 19910415 | 9/2000 |
| DE | 19939998 | 3/2001 |
| DE | 10049462 | 4/2002 |
| EP | 0711975 | 5/1996 |

* cited by examiner

*Primary Examiner*—Hezron Williams
*Assistant Examiner*—Samir M. Shah
(74) *Attorney, Agent, or Firm*—Elliott N. Kramsky

(57) ABSTRACT

In a method for determining the zero-point error of a Coriolis gyro, the resonator of the Coriolis gyro has a disturbance force applied to it such that a change in the stimulation oscillation of the resonator is brought about. A change in the read oscillation of the resonator, caused by a partial component of the disturbance force, is extracted from a read signal which represents the read oscillation of the resonator as a measure of the zero-point error.

10 Claims, 5 Drawing Sheets

Forces

Movement

Forces

Movement

METHOD FOR DETECTING A ZERO-POINT ERROR OF A CORIOLIS GYROSCOPE AND CORIOLIS GYROSCOPE USING SAID METHOD

BACKGROUND

1. Field of the Invention

The present invention relates to Coriolis gyros. More particularly, this invention pertains to a method for determining the zero-point error of a Coriolis gyro.

2. Description of the Prior Art

Coriolis gyros (also known as "vibration gyros") are increasingly employed for navigation. Such devices include a mass system that is caused to oscillate. Such oscillation is generally a superimposition of a large number of individual oscillations. The individual oscillations of the mass system are initially independent of one another and each may be regarded in the abstract as a "resonator". At least two resonators are required for operation of a vibration gyro. A first resonator is artificially stimulated to oscillate, with such oscillations referred to below as a "stimulation oscillation". A second resonator is stimulated to oscillate only when the vibration gyro is moved or rotated. That is, Coriolis forces occur which couple the first resonator to the second resonator, draw energy from the stimulation oscillation of the first resonator, and transfer the energy to the read oscillation of the second resonator. The oscillation of the second resonator is referred to below as the "read oscillation". In order to determine movement (in particular rotation) of the Coriolis, the read oscillation is tapped off and a corresponding read signal (e.g. the tapped-off read oscillation signal) is analyzed to determine whether any changes occurred in the amplitude of the read oscillation that measures rotation of the Coriolis gyro. Coriolis gyros may be in the form of either an open loop or a closed loop system. In a closed loop system, the amplitude of the read oscillation is continuously reset to a fixed value (preferably zero) by control loops.

FIG. 2 is a schematic diagram of a closed loop Coriolis gyro 1. The gyro 1 has a mass system 2 that can be caused to oscillate and is referred to below as a resonator 2 (in contrast to the "abstract" resonators, mentioned above, which represent individual oscillations of the "real" resonator). As already mentioned, the resonator 2 may be regarded as a system composed of two "resonators" (a first resonator 3 and a second resonator 4). Each of the first and second resonators 3, 4 is coupled to a force transmitter (not shown) and to a tapping-off system (not shown). Noise produced by the force transmitter and the tapping-off system is indicated schematically by noise 1 (reference symbol 5) and noise 2 (reference symbol 6).

The Coriolis gyro 1 includes four control loops. A first control loop is employed for controlling the stimulation oscillation (i.e. the frequency of the first resonator 3) at a fixed frequency (resonant frequency). The first control loop has a first demodulator 7, a first low-pass filter 8, a frequency regulator 9, a VCO (voltage controlled oscillator) 10 and a first modulator 11. A second control loop controls the stimulation oscillation at a constant amplitude and includes a second demodulator 12, a second low-pass filter 13 and an amplitude regulator 14.

Third and fourth control loops are used for resetting forces that stimulate the read oscillation. The third control loop includes a third demodulator 15, a third low-pass filter 16, a quadrature regulator 17 and a second modulator 18. The fourth control loop comprises a fourth demodulator 19, a fourth low-pass filter 20, a rotation rate regulator 21 and a third modulator 22.

The first resonator 3 is stimulated at its resonant frequency $\omega 1$. The resultant stimulation oscillation is tapped off, demodulated in phase by means of the first demodulator 7, and a demodulated signal component passed to the first low-pass filter 8 that removes the sum frequencies. The tapped-off signal is referred to below as the tapped-off stimulation oscillation signal. An output from the first low-pass filter 8 is supplied to a frequency regulator 9 that controls the VCO 10 as a function of the applied signal so that the in-phase component essentially tends to zero. For this, the VCO 10 sends a signal to the first modulator 11, which controls a force transmitter so that a stimulation force is applied to the first resonator 3. When the in-phase component is zero, the first resonator 3 oscillates at its resonant frequency $\omega 1$. It should be mentioned that all of the modulators and demodulators are operated on the basis of resonant frequency $\omega 1$.

The tapped-off stimulation oscillation signal is also passed to the second control loop and demodulated by the second demodulator 12. The output of the second demodulator 12 is passed through the second low-pass filter 13, whose output signal is, in turn, applied to the amplitude regulator 14. The amplitude regulator 14 controls the first modulator 11 as a function of such signal and of a nominal amplitude transmitter 23 such that the first resonator 3 oscillates at a constant amplitude (i.e. the stimulation oscillation has constant amplitude).

As has already been mentioned, movement or rotation of the Coriolis gyro 1 results in Coriolis forces (indicated by the $FC \cdot \cos(\omega 1 \cdot t)$ in the drawing) that couple the first resonator 3 to the second resonator 4, causing the second resonator 4 to oscillate. A resultant read oscillation at frequency $\omega 2$ is tapped off so that a corresponding tapped-off read oscillation signal (read signal) is supplied to both the third and fourth control loops. In the third control loop, this signal is demodulated by means of the third demodulator 15, the sum frequencies removed by the third low-pass filter 16, and the low-pass-filtered signal supplied to quadrature regulator 17 whose output is applied to the third modulator 22 so that corresponding quadrature components of the read oscillation are reset. Analogously, the tapped-off read oscillation signal is demodulated in the fourth control loop by means of a fourth demodulator 19. It then passes through a fourth low-pass filter 20 and the filtered signal is applied to a rotation rate regulator 21. The output of the rotation rate regulator 21 is proportional to the instantaneous rotation rate and is passed as the rotation rate measurement to a rotation rate output 24 and to the second modulator 18, which resets the corresponding rotation rate components of the read oscillation.

A Coriolis gyro 1 as described above can be operated in either a double-resonant form or in a form in which it is not double-resonant. When the Coriolis gyro 1 is operated in a double-resonant form, the frequency of $\omega 2$ of the read oscillation is approximately equal to the frequency $\omega 1$ of the stimulation oscillation. In contrast, when it is operated in a form in which it is not double-resonant, the frequency $\omega 2$ of the read oscillation differs from the frequency $\omega 1$ of the stimulation oscillation. In the case of double-resonance, the output signal from the fourth low-pass filter 20 contains information about the rotation rate, while, when it is not operated in double-resonant form, the output signal from the third low-pass filter 16 contains the rotation rate information. A doubling switch 25 which selectively connects the outputs of the third and fourth low-pass filters 16, 20 to the rotation rate regulator 21 and to the quadrature regulator 17 is provided for switching between the double-resonant and non-double resonant modes.

Due to inevitable manufacturing tolerances, it is not possible to avoid the force transmitter system that stimulates the first resonator (stimulation oscillation) while also slightly stimulating the second resonator (read oscillation). The tapped-off read oscillation signal thus includes a part due to Coriolis forces and a part (undesirably) due to manufacturing tolerances. The undesirable part results in the Coriolis gyro having a zero-point error whose magnitude is not possible to distinguish between the two parts when tapping off the tapped-off read oscillation signal.

SUMMARY AND OBJECTS OF THE INVENTION

It is therefore the object of the present invention to provide a method for determining the zero-point error due to manufacturing tolerances in a Coriolis gyro.

The present invention addresses the above object by providing, in a first aspect, a method for determining the zero-point error of a Coriolis gyro. A disturbance force is applied to the resonator of the Coriolis gyro to bring about a change in the stimulation oscillation of the resonator. A change in the read oscillation of the resonator, produced by a partial component of the disturbance force, is extracted, as a measure of zero-point error, from a read signal that represents the read oscillation of the resonator.

In a second aspect, the invention provides a Coriolis gyro. The gyro is characterized by a device that includes a disturbance unit that applies a disturbance force to the resonator of the Coriolis gyro to modulate the stimulation oscillation of the resonator. A disturbance signal detection unit determines a disturbance component, produced by a partial component of the disturbance force, contained in a read signal (which represents the read oscillation) as a measure of the zero-point error.

The preceding and other features of the invention will become further apparent from the detailed description that follows. Such description is accompanied by a set of drawings. Numerals of the drawings, corresponding to those of the written description, point to the features of the invention with like numerals referring to like features throughout.

DETAILED DESCRIPTION OF THE PREFERRED EMBODIMENT

The general operation of a Coriolis gyro is explained below. In this regard, reference will be made to FIGS. 3, 4A through 4D and 5A through 5D.

Figure 3:
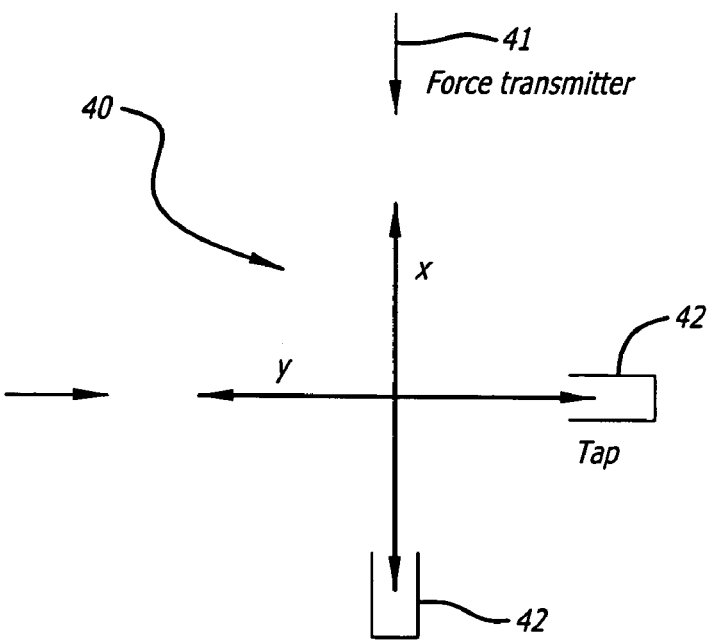
FIG. 3 is a diagram for illustrating the interaction of a resonator, a force transmitter system and a tapping-off system in a Coriolis gyro.

FIG. 3 is a diagram for illustrating the interaction of a resonator, a force transmitter system and a tapping-off system in a Coriolis gyro. It schematically represents the Coriolis gyro as a system 40 comprising a resonator (not shown), a force transmitter system 41 and a tapping-off system 42. Possible oscillations x (stimulation) and y (read) are additionally indicated that are coupled to one another by Coriolis forces resulting from rotations at right angles to the plane of the drawing. The x oscillation (complex) is stimulated by the alternating force with complex amplitude Fx (in this case, only the real part Fxr). The y oscillation (complex) is reset by the alternating force at the complex amplitude Fy with the real part Fyr and the imaginary part Fyi. (The rotation vector $\exp(i*\omega*t)$ is omitted in each case.)

FIGS. 4A through 4D are a series of diagrams for illustrating the forces and oscillation amplitudes of a Coriolis gyro with double resonance. That is, they show the complex forces and complex oscillation amplitudes for an ideal Coriolis gryo having the identical resonant frequency of x and y oscillations. The force Fxr and the stimulation frequency of the gyro are controlled to produce a purely imaginary, constant x oscillation. This is accomplished by means of an amplitude regulator 14 that controls the magnitude, and a phase regulator 10 that controls the phase of the x oscillation. The operating ferquency $\omega 1$ is controlled so that the x oscillation is purely imaginary (i.e., the real part of the x oscillation is zero.)

Figure 4A:
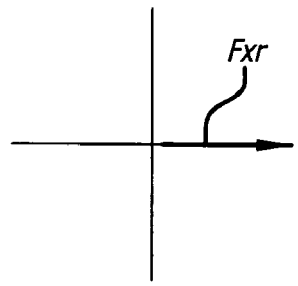
FIGS. 4A through 4D are a series of diagrams for illustrating the forces and oscillation amplitudes of a Coriolis gyro with double resonance.
Figure 4B:
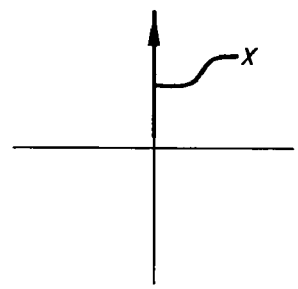
Figure 4C:
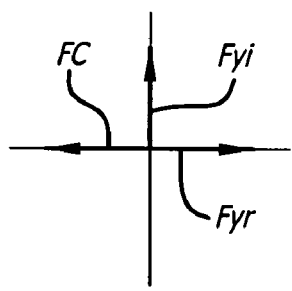
Figure 4D:
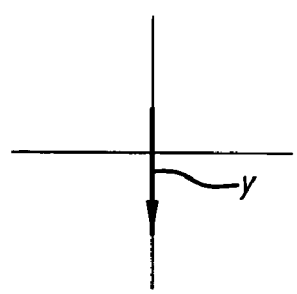
Figure 5A:
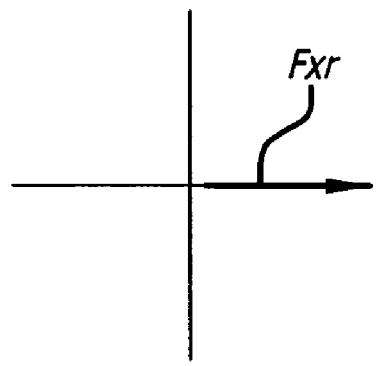
FIGS. 5A through 5D are a series of diagrams for illustrating the forces and oscillation amplitudes of a Coriolis gyro near double resonance.
Figure 5B:
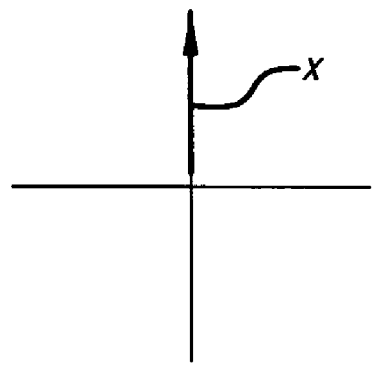
Figure 5C:
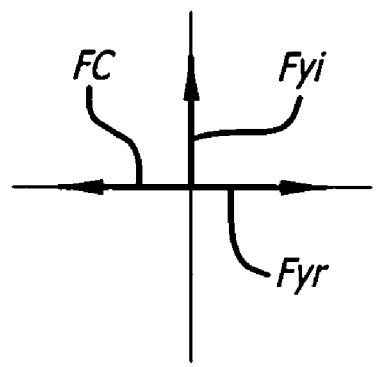
Figure 5D:
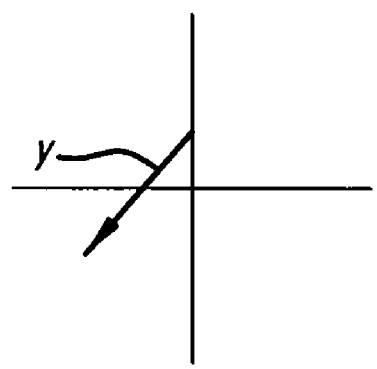
Figure 6A:
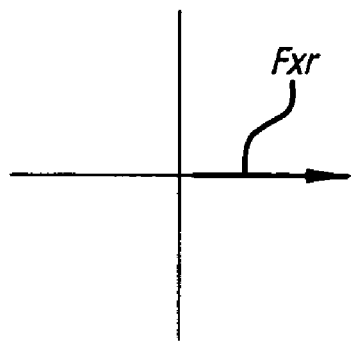
FIGS. 6A through 6D are a series of diagrams for illustrating the method of the invention.
Figure 6B:
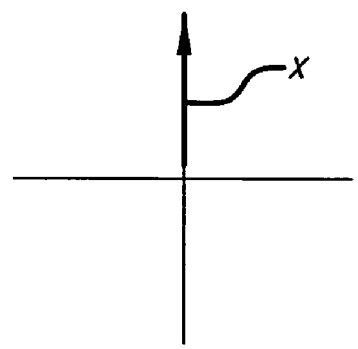
Figure 6C:
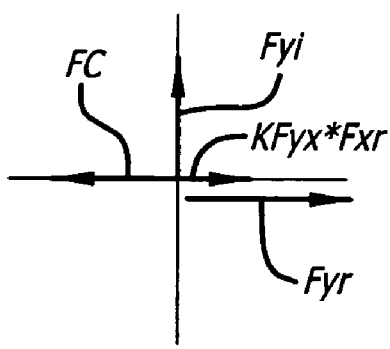
Figure 6D:
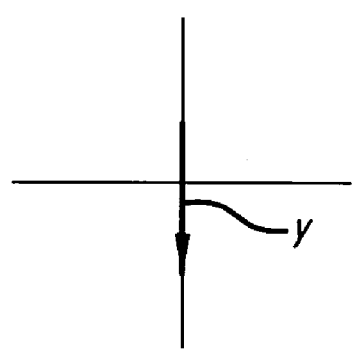

The Coriolis force during rotation, FC, is now purely real, since the Coriolis force is proportional to the speed of the x oscillation. If both oscillations have the same resonant frequency, then the y oscillation, caused by the force FC, is as illustrated in FIG. 4D.

When double resonance is present, the real part of the taped-off y signal is zero. It is not if double resonance is not present. In both cases, the Coriolis force FC is zeroed. In the case of reset gyros, this is accomplished by a regulator for Fyr, which compensates for FC. In the case of Coriolis gyros operated with double resonance, the imaginary part of y is zeroed by means of Fyr, and the real part of y is zeroed by means of Fyi. The bandwidth of the two control processes is approximately 100 Hz.

Figure 1:
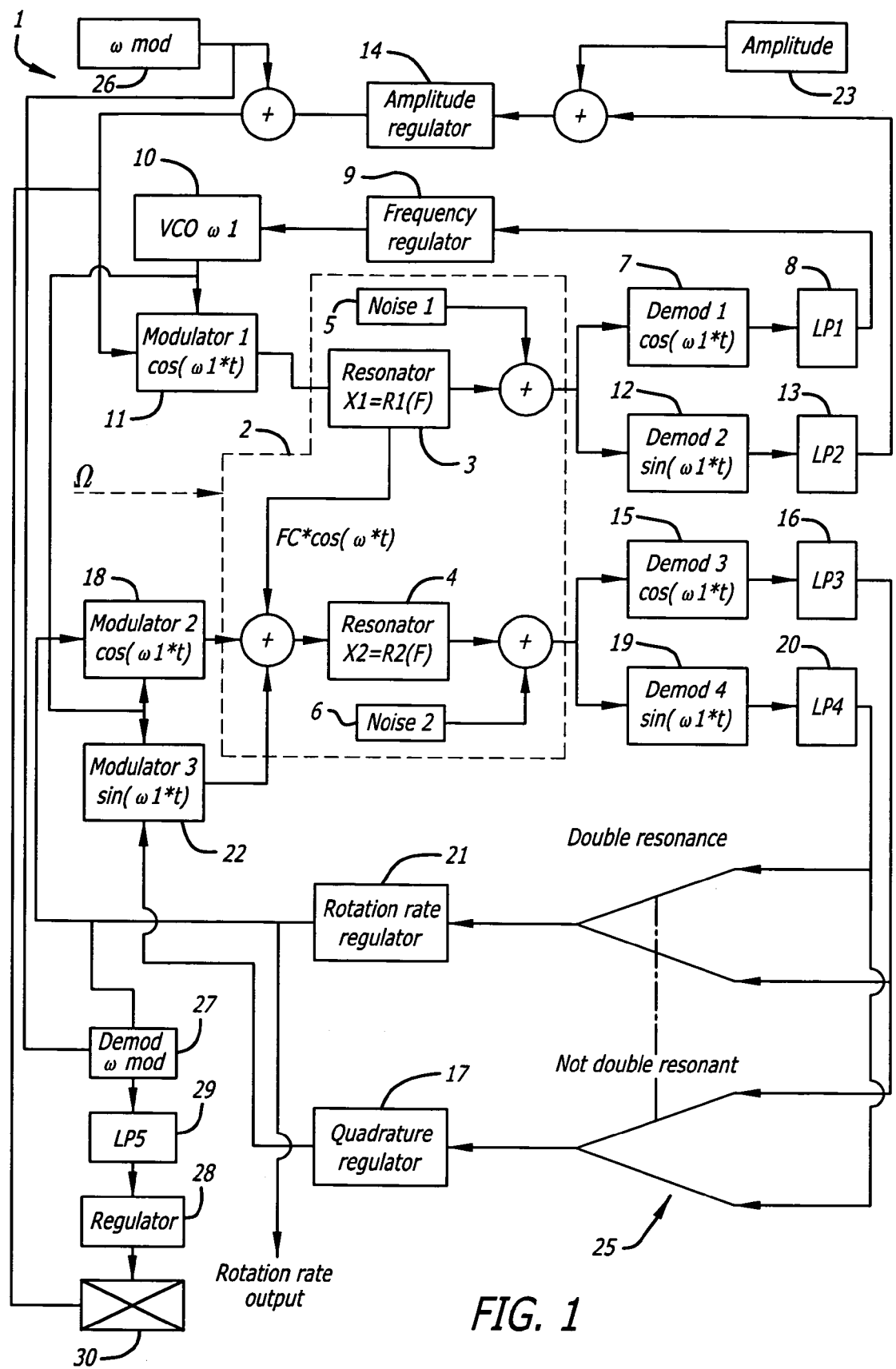
FIG. 1 is a schematic diagram of a Coriolis gyro based on the method of the invention.

The method of the invention will now be explained with reference to the schematic diagram of a resetting Coriolis gyro 1' of FIG. 1. The resetting Coriolis gyro 1' additionally includes a disturbance unit 26, a demodulation unit 27, a regulator 28, a fifth low-pass filter 29 and a multiplier 30.

The disturbance unit 26 generates an alternating signal of frequency $\omega$mod that is added to the output of the amplitude regulator. As an alternative, band-limited noise can also be used as a disturbance signal. Furthermore, this alternating signal is supplied to the demodulation unit 27. The collated signal obtained in this way (output from the amplitude regulator and alternating signal) is supplied to a (first) modulator 11 whose output is applied to a force transmitter (not shown), and, thus to the resonator 2. As a result, an alternating force that corresponds to the alternating signal is also applied to the resonator 2. Such alternating force can be observed, after "passing through" the resonator 2, in the form of a disturbance component on the tapped-off read oscillation signal.

In this example, the signal emitted from the rotation rate regulator is subjected to a demodulation process carried out by the demodulation unit 27 at the frequency ωmod (disturbance frequency). The signal (disturbance component) obtained is filtered by the fifth low-pass filter 29 and supplied to the control unit 28. The signal supplied to the control unit 28 represents a measure of the zero-point error. The control unit 28 produces an output signal as a function of the signal supplied to it. Such output signal is supplied to the multiplier 30 and is in such a form that the disturbance component of the tapped-off read oscillation signal is controlled to be as small as possible. The multiplier 30 multiplies the collated signal (output signal from the amplitude regulator and alternating signal) supplied to it by the output from the control unit 28, and, thus, produces an output signal that is added to the signal emitted from the rotation rate regulator. The bias of the Coriolis gyro is thus reset. The signal supplied to the demodulation unit 27, which may also be the signal supplied to the rotation rate regulator 21, or supplied to/emitted from the quadrature regulator 17. The signal supplied to the demodulation unit 27 may also be the tapped-off read oscillation signal itself. In the latter case, the operating frequency ω must also be accounted for during the demodulation process.

In principle, it is possible to feed the output signal from the multiplier 30 into the rotation rate control loop at any desired point (not only directly upstream of the second modulator 18, i.e., at any desired point between the point at which the read oscillation is tapped off and the third modulator 22). Analogous considerations apply to feeding the disturbance signal into the quadrature control loop.

Reference is now made to FIGS. 6A through 6D, a series of diagrams for further illustrating the method of the invention. The read oscillation will in general "see" a small proportion of the stimulation force Fxr: kFyx*Fxr as a result of manufacturing tolerances. When the Fyr control loop is closed, Fyr is thus changed by kFyx*Fyr when compared to the correct value. This results in a corresponding bias, as Fyr is a measure of the rotation rate.

To compensate for this error, the amplitude of Fxrt is modulated without any mean value by the disturbance unit 26. The modulation frequency (or frequencies) of the band-limited modulation noise should be chosen so that the stimulation oscillation is disturbed as little as possible while the rotation rate control loop is disturbed as strongly as possible (via the component kFyx*Kxr.) The error component in Fyr (kFyx*Fxr) is now compensated for by the addition of a controlled component kFyxcomp*Fxr to Fyr in such a way that the modulation in the rotation rate channel disappears. This is achieved by controlling kFyxcomp, which is emitted from the regulator unit 28 (preferably by software). The input signal to a corresponding regulator (the regulator unit 28) is the signal of Fyr, demodulated synchronously with the modulation frequency. When the regulator is matched, the modulation signal in the rotation rate channel disappears, and there is no need for a blocking filter for the modulation frequency in the rotation rate output.

Figure 2:
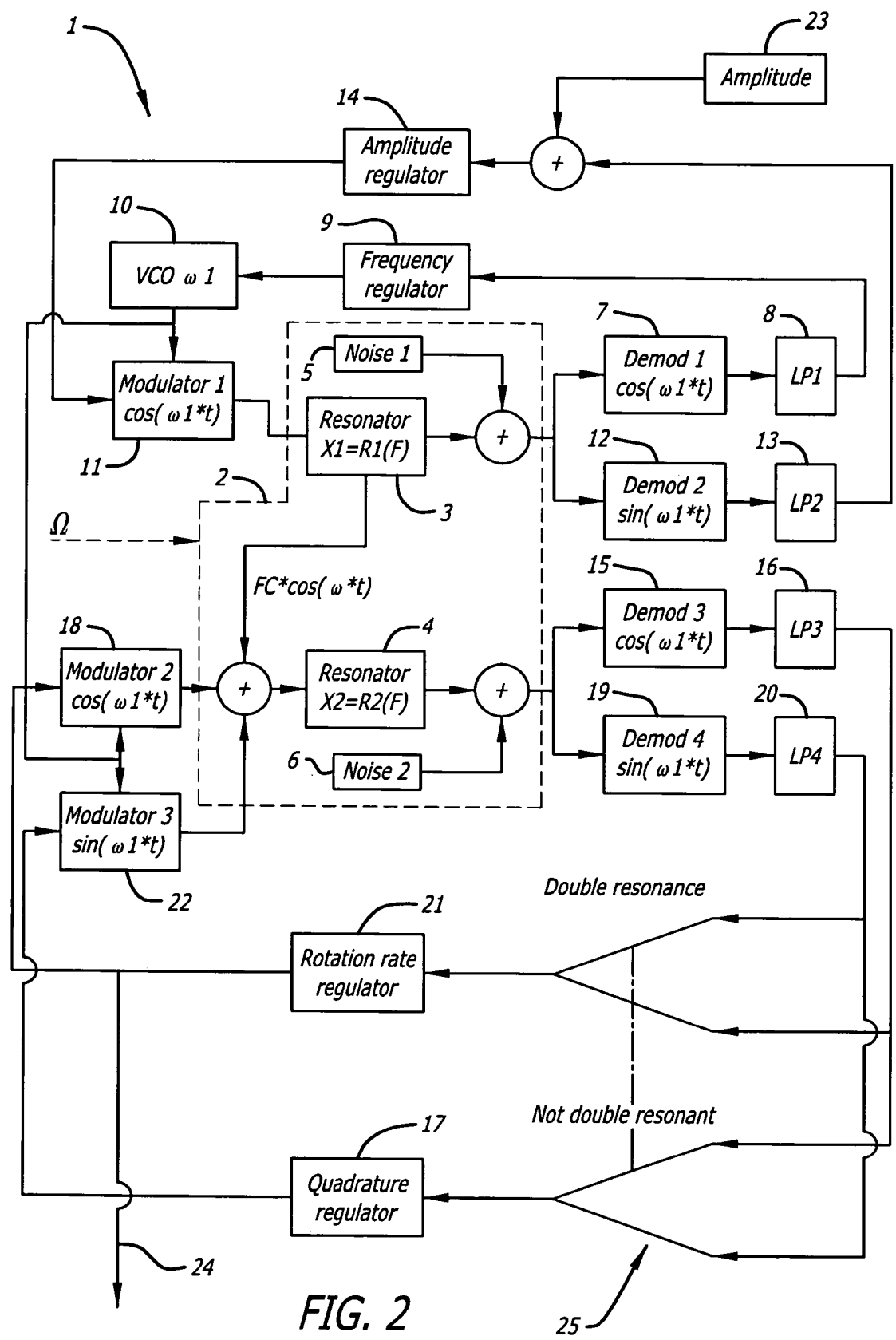
FIG. 2 is a schematic diagram of a Coriolis gyro in accordance with the prior art.

In this case, "resonator" refers to the entire mass system (or part of it) that can be caused to oscillate in the Coriolis gyro (i.e., with reference to FIG. 2, that part of the Coriolis gyro that is annotated with reference numeral 2).

A major discovery on which the invention is based is that an artificial change to the stimulation oscillation resulting from the application of appropriate disturbance forces to the resonator can be observed in the tapped-off read oscillation signal: the change (modulation) of the stimulation oscillation also results in a change in the read oscillation due to the manufacturing tolerances of the Coriolis gyro. That is, the disturbance force is applied essentially to the first resonator, but a partial component of this disturbance force is also applied to the second resonator. The "penetration strength" of a disturbance such as this to the tapped-off read oscillation signal is thus a measure of the zero-point error ("bias") of the Coriolis gyro. If, therefore, the strength of the disturbance component contained in the read signal is determined and compared with the strength of the disturbance force (change in the stimulation oscillation), the zero-point error can be derived. A disturbance component signal which is proportional to the disturbance component can then be used to compensate directly for the zero-point error.

The disturbance forces are preferably produced by disturbance signals that are supplied to appropriate force transmitters, or are added to signals which are supplied to the force transmitters. For example, a disturbance signal can be added to the respective control signals for control of the stimulation oscillation, to produce the disturbance force.

The disturbance signal is preferably an alternating signal (e.g. a superposition of sine-wave signals and cosine-wave signals). An alternating signal of this type produces an alternating force via corresponding force transmitters that modulates the amplitude of the stimulation oscillation. The alternating signal is generally at a fixed disturbance frequency so that the disturbance component of the tapped-off read oscillation signal can be determined by means of an appropriate demodulation process carried out at the disturbance frequency.

The disturbance frequency of the disturbance signal/disturbance force preferably has a period which is substantially shorter than the time constant of the stimulation oscillation and of the same order of magnitude (or greater than) the time constant of the Coriolis gyro. One alternative is to employ band-limited noise as a disturbance in the place of an alternating signal. In such case, the disturbance component is demodulated from the read signal by correlation of the noise signal with the signal that contains the disturbance component, (e.g. the tapped-off read oscillation signal.)

The method described above can be used for both an open loop and a closed loop Coriolis gyro. In the latter case, the zero-point error can be compensated for as follows: a linear combination is formed of a controlled part of an alternating signal, which produces the stimulation oscillation, preferably including the disturbance signal, and an alternating signal which results in the read oscillation being reset. This is passed to a rotation rate control loop/quadrature control loop for the Coriolis gyro. The controlled part is controlled so that the change in the read oscillation (determined from the read signal) becomes as small as possible as a result of the modulation (i.e. the disturbance component).

The disturbance component may, for example, be determined directly from the tapped-off read oscillation signal. The expression "read signal" covers this signal as well as the signal applied to a quadrature regulator in a quadrature control loop, or emitted from it, as well as the signal applied to, or emitted from, a rotation rate regulator in a rotation rate control loop.

If the disturbance force results from an alternating force at a specific disturbance frequency, the disturbance signal detection unit has a demodulation unit by means of which the read signal is subjected to a demodulation process (a synchronous demodulation at the disturbance frequency). This results in the disturbance component being determined from the read signal. Alternatively, band-limited noise may be used as the disturbance signal.

The Coriolis gyro is preferably resetting (i.e. it has a rotation rate control loop and a quadrature control loop.) In a resetting Coriolis gyro, a control unit is advantageously provided to compensate for the zero-point error. A control unit produces a linear combination of a controlled part of an alternating signal that produces the stimulation oscillation (preferably including the disturbance signal) and an alternating signal. This results in resetting of the read oscillation and passing the collated signal to the rotation rate control loop/quadrature control loop of the Coriolis gyro. The linear combination of signals is controlled by the control unit so that the disturbance component of the read oscillation, as determined from the read signal, becomes as small as possible. The zero-point error of the Coriolis gyro is thus compensated.

The disturbance signal detection unit preferably determines the disturbance component from a signal that is emitted from a rotation rate regulator in the rotation rate control loop. The control loop in this example adds the linear combination of signals to an output signal from the rotation rate regulator.

While the invention has been described with reference to its presently-preferred embodiment, it is not limited thereto. Rather, the invention is limited only insofar as it is defined by the following set of patent claims and includes within its scope all equivalents thereof.

The invention claimed is:

1. A method for determining the zero-point error of a Coriolis gyro, wherein
   the resonator of the Coriolis gyro has a disturbance force applied to it such that a change in the stimulation oscillation of the resonator is brought about, and
   a change in the read oscillation of the resonator, which is produced by a partial component of the disturbance force, is extracted from a read signal which represents the read oscillation of the resonator as a measure of the zero-point error.

2. The method as claimed in claim 1, characterized in that the disturbance force is an alternating force which modulates the amplitude of the stimulation oscillation.

3. The method as claimed in claim 2, characterized in that the disturbance force has a disturbance frequency whose period is substantially shorter than the time constant of the stimulation oscillation but is of the same order of magnitude as or greater than the time constant of the Coriolis gyro.

4. The method as claimed in claim 2, characterized in that the change in the read oscillation is detected by subjecting the read signal to a demodulation process on the basis of a disturbance frequency.

5. The method as claimed in claim 1, characterized in that the disturbance force is produced by a disturbance signal which is band-limited noise.

6. The method as claimed in claim 1, characterized in that a linear combination is formed of a controlled part of an alternating signal, which produces the stimulation oscillation, and an alternating signal, which results in the read oscillation being reset, and is passed to a rotation rate control loop/quadrature control loop for the Coriolis gyro, in such a way that the change in the read oscillation determined from the read signal becomes as small as possible.

7. A Coriolis gyro, characterized by a device for determining the zero-point error of the Coriolis gyro, having:
   a disturbance unit which applies a disturbance force to the resonator of the Coriolis gyro such that the stimulation oscillation of the resonator is modulated,
   a disturbance signal detection unit, which determines a disturbance component which is contained in a read signal (which represents the read oscillation) and has been produced by a partial component of the disturbance force, as a measure of the zero-point error.

8. The Coriolis gyro as claimed in claim 7, characterized by a rotation rate control loop/quadrature control loop.

9. The Coriolis gyro as claimed in claim 8, characterized by a control unit, which forms a linear combination of a controlled part of an alternating signal, which produces the stimulation oscillation, and an alternating signal which results in the read oscillation being reset, and passes it to the rotation rate control loop/quadrature control loop for the Coriolis gyro, with the control unit controlling the linear combination of the signals such that the disturbance component, which is determined from the read signal, of the read oscillation becomes as small as possible.

10. The Coriolis gyro as claimed in claim 9, characterized in that the disturbance signal detection unit determines the disturbance component from a signal which is emitted from a rotation rate regulator in the rotation rate control loop, and the linear combination of the signals is added to an output signal from the rotation rate regulator.

* * * * *